US009047861B2

(12) United States Patent
Ma

(10) Patent No.: US 9,047,861 B2
(45) Date of Patent: Jun. 2, 2015

(54) ELECTRONIC DEVICE FOR CONVERTING AUDIO FILE FORMAT

(75) Inventor: Shou-Ke Ma, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 726 days.

(21) Appl. No.: 13/302,912

(22) Filed: Nov. 22, 2011

(65) Prior Publication Data

US 2012/0300946 A1 Nov. 29, 2012

(30) Foreign Application Priority Data

May 24, 2011 (CN) .......................... 2011 1 0135198

(51) Int. Cl.

| | |
|---|---|
| ***H04B 1/00*** | (2006.01) |
| ***H04R 5/00*** | (2006.01) |
| ***G10L 19/008*** | (2013.01) |
| ***H04S 5/00*** | (2006.01) |

(52) U.S. Cl.

CPC ................. *G10L 19/008* (2013.01); *H04S 5/00* (2013.01); *H04S 5/005* (2013.01); *H04S 2400/05* (2013.01)

(58) Field of Classification Search

CPC ..... G10L 19/008; H04S 5/00; H04S 2400/05; H04S 5/005

USPC ........ 381/1, 17, 18, 119; 704/500, 501, 200.1

See application file for complete search history.

(56) References Cited

U.S. PATENT DOCUMENTS

| | | | | |
|---|---|---|---|---|
| 7,840,411 | B2 * | 11/2010 | Hotho et al. | 704/500 |
| 2006/0165184 | A1 * | 7/2006 | Purnhagen et al. | 375/242 |
| 2008/0219475 | A1 * | 9/2008 | Oh et al. | 381/119 |
| 2010/0153118 | A1 * | 6/2010 | Hotho et al. | 704/500 |

FOREIGN PATENT DOCUMENTS

| | | | |
|---|---|---|---|
| CN | 1898991 | A | 1/2007 |
| CN | 101036414 | A | 9/2007 |
| CN | 101154420 | A | 4/2008 |

* cited by examiner

*Primary Examiner* — Fan Tsang
*Assistant Examiner* — Eugene Zhao
(74) *Attorney, Agent, or Firm* — Novak Druce Connolly Bove + Quigg LLP

(57) ABSTRACT

An electronic device for converting a multi-channel audio file to a dual channel audio file and vice versa. The multichannel audio file includes a right channel group and a left channel group of channel signals. The electronic device respectively mixes the channel signals of the right channel group and the left channel group according to a mixed matrix to form N mixed signals, and cross embeds the N mixed signals to from a left channel audio signal and a right channel audio signal to compose the dual channel audio file. The electronic device samples, recombines and decodes the left channel audio signal and the right channel audio signal according to a decoding matrix, which is the inverse of the mixed matrix, to revert to the original multi-channel audio file.

4 Claims, 5 Drawing Sheets

ELECTRONIC DEVICE FOR CONVERTING AUDIO FILE FORMAT

BACKGROUND

1. Technical Field

The present disclosure relates to electronic devices, and particularly, relates to an electronic device for converting audio file formats.

2. Description of Related Art

The multichannel audio file like Dolby® Surround 5.1 is close representation of the original features of sound. However, many apparatuses do not support the multichannel audio file. Therefore there is room for improvement in the art.

BRIEF DESCRIPTION OF THE DRAWINGS

The components of the drawings are not necessarily drawn to scale, the emphasis instead being placed upon clearly illustrating the principles of the embodiments of the electronic device for converting audio file formats. Moreover, in the drawings, like reference numerals designate corresponding parts throughout several views.

DETAILED DESCRIPTION

Figure 1:
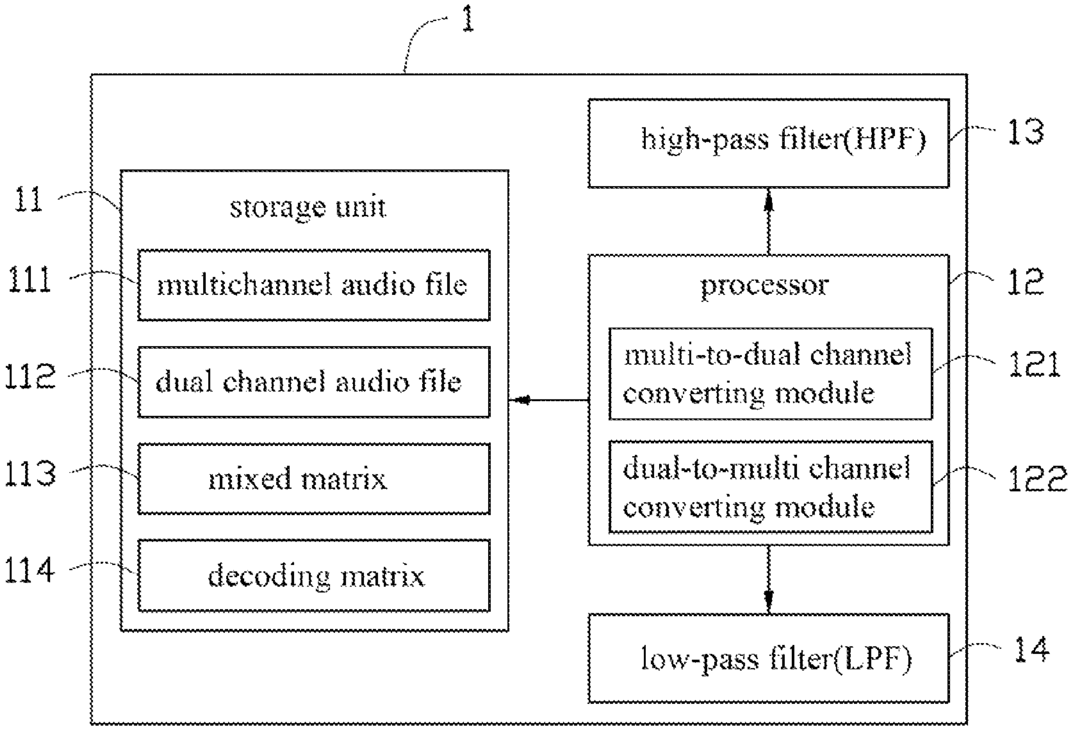
FIG. 1 is a block diagram of the electronic device, according to an exemplary embodiment of the present disclosure.

Referring to FIG. 1, the electronic device 1 for converting audio file format according to an exemplary embodiment is shown. The electronic device 1 is capable of converting a multichannel audio file to a dual channel audio file, and converting the dual channel audio file back to the original multichannel audio file. The "multichannel" means three or more channels hereinafter.

The electronic device 1 includes a storage unit 11, a processor 12, a high-pass filter (HPF) 13 and a low-pass filter (LPF) 14. The storage unit 11 stores a multichannel audio file 111, a dual channel audio file 112, a mixed matrix 113 and a decoding matrix 114, wherein the dual channel audio file 112 is converted from the multichannel audio file 111. The multichannel audio file 111 has several channel signals (not shown in FIG. 1), and a left channel group and a right channel group are established for assorting the channel signals. The left channel group and the right channel group include the same number of channel signals. "N" is used to represent the aforesaid number of channel signals within the two group in the following description, and N is bigger than two inclusive in the present disclosure.

In some embodiment, the multichannel audio file 111 is a Dolby® Surround 5.1 audio file. Dolby® Surround 5.1 audio file includes a center channel signal, a left channel signal, a left surround channel signal, a right channel signal, a right surround channel signal, and a Low Frequency Effects (LFE) channel. A left channel group and a right channel group are established, wherein the left channel group includes the center channel signal, the left channel signal and the left surround channel signal; and the right channel group includes the center channel signal, the right channel signal and the right surround channel signal. The center channel signal is simultaneously counted as one channel signal of the left channel group and one channel signal of the right channel group. As a result, N is 3.

The mixed matrix 113 is for converting the multichannel audio file 111 to the dual channel audio file 112, and the decoding matrix 114 is for reverting the dual channel audio file 112 back to the multichannel audio file 111. The mixed matrix 113 is invertible, and the decoding matrix 114 is the inverse of the mixed matrix 113. The mixed matrix 113 and the decoding matrix 114 are related to the number of channel signals included in the multichannel audio file 111.

More specifically, the count of rows and the count of columns of the mixed matrix 113 and the decoding matrix 114 are corresponding to the number of the channel signals in the left channel group or the right channel group (which is N). In sum, the mixed matrix 113 and the decoding matrix 114 are both N×N matrix in this embodiment. The multi-to-dual channel converting module 121 is utilized to convert the multichannel audio file 111 to the dual channel audio file 112, and the dual-to-multi channel converting module 122 is utilized to convert the dual channel audio file 112 to the multichannel audio file 111.

Figure 2:
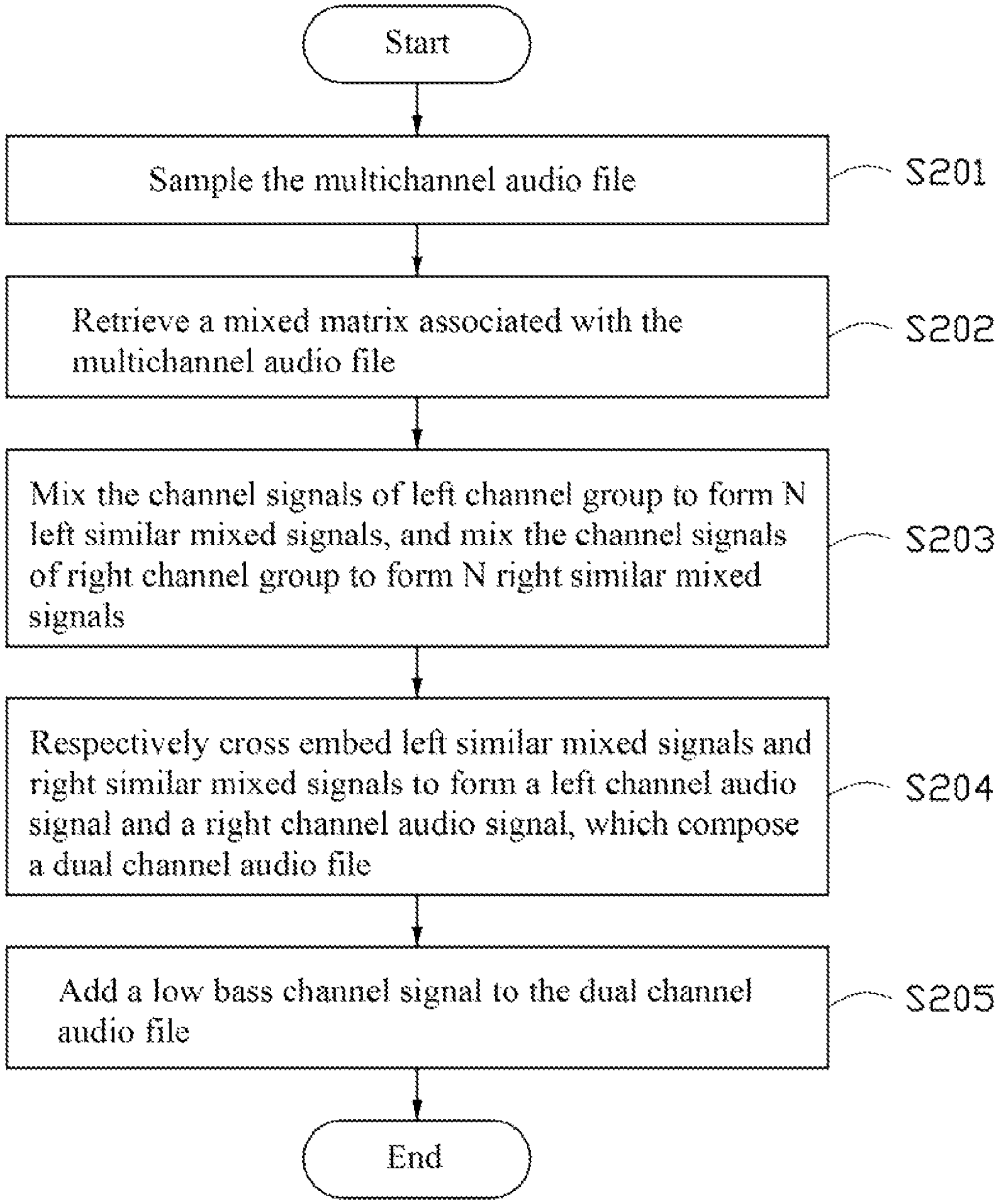
FIG. 2 is a flowchart showing how the electronic device converts the multichannel audio file to the dual channel audio file.
Figure 3:
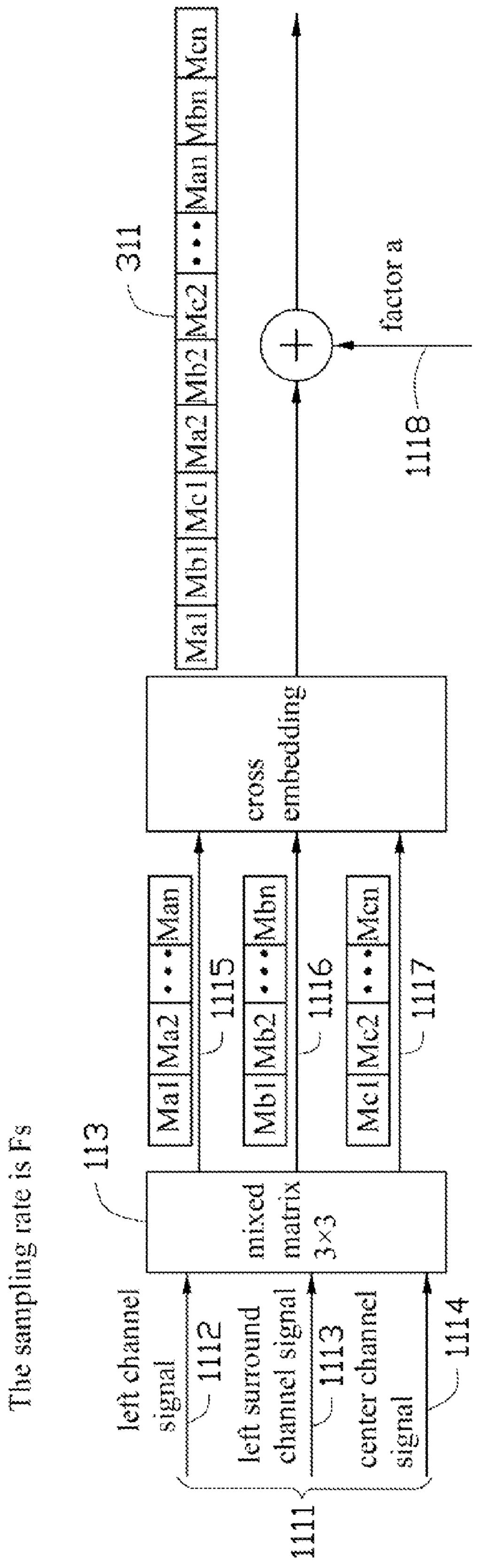
FIG. 3 is a block diagram showing how the electronic device converts the multichannel audio file to the dual channel audio file.

FIG. 2 and FIG. 3 illustrate how the multi-to-dual channel converting module converts the multichannel audio file to the dual channel audio file. The multi-to-dual channel converting module 121 responds to the operation by a user, retrieving the multichannel audio file 111 and sampling it (S201). Then, the multi-to-dual channel converting module 121 obtains the mixed matrix 113 relating to the multichannel audio file 111 (S202), which is a 3×3 matrix as shown below:

$$\begin{Bmatrix} 1.00 & 0.70 & 0.40 \\ 1.05 & 0.60 & 0.45 \\ 0.95 & 0.60 & 0.50 \end{Bmatrix}$$

As the left channel group 1111 and right channel group both have N channel signals, the multi-to-dual channel converting module 121 mixes the N channel signals of the left channel group 1111 to form N left mixed signal, and mixes the N channel signals of the right channel group to form N right mixed signals (S203). The left mixed signals are similar with each others, so does the right mixed signals.

Referring to FIG. 3, the left channel group 1111 of Dolby® Surround 5.1 audio file includes 3 (N) channel signals: the left channel signal 1112, the left surround channel signal 1113 and the center channel signal 1114. The left channel signal 1112, the left surround channel signal 1113 and the center channel signal 1114 are sampled and then mixed (embedding with each other to form new combined signals) according to the mixed matrix 113 to form three (N) left mixed signals. The three left mixed signals includes a first mixed signal 1115 of "Ma1Ma2 . . . Man", a second mixed signal 1116 of "Mb1Mb2Mb3 . . . Mbn", and a third mixed signal 1117 of "Mc1Mc2 . . . Mcn".

The first row of the mixed matrix 113 are the mixing factors respectively relating to the left channel signal 1112, the left surround channel signal 1113 and the center channel signal 1114, for calculating the first mixed signal 1115. The second row of the mixed matrix 113 are the mixing factors respectively relating to the left channel signal 1112, the left surround channel signal 1113 and the center channel signal 1114, for calculating the second mixed signal 1116. The third row of the mixed matrix 113 are the mixing factors respectively relating to the left channel signal 1112, the left surround channel signal 1113 and the center channel signal 1114, for calculating the third mixed signal 1117.

For maintaining the quality of the sound, the mixing factors are adjusted according to the audio file features of Dolby® Surround 5.1 and the way that the human ear senses sound, to make the original left channel signal 1113 and the original left surround channel signal 1113 play the leading roles in those left mixed signal. Moreover, those mixing factors are similar with each others, to make the first mixed signal 1115, the second mixed signal 1116 and the third mixed signal 1117 be similar with each other. Meanwhile, the mixing factors of the mixed matrix 113 shown in above-mentioned figure are just examples according to the exemplary embodiment. They are adjustable as appropriate.

After the step 203, the multi-to-dual channel converting module 121 cross embeds the 3 (N) left mixed signals, which are first mixed signal 1115, second mixed signal 1116 and third mixed signal 1117, to form a left channel audio signal 311. Similarly, the 3(N) right mixed signals are cross embedded to form a right channel audio signal (not shown in FIG. 3) (S204). The left channel audio signal 311 and the right channel audio signal compose the dual channel audio file 112.

Furthermore, cross embedding means to sample the N left mixed signals and the N right mixed signals simultaneously in a sampling rate, then mix the data sampling from every sampling point of the N left mixed signals to form the left channel audio signal 311, and mix the data sampling from every sampling point of the N right mixed signals to form the right channel audio signal. As shown in FIG. 3, the data sampling from the first sampling point "Ma1" of the first mixed signal 1115 is cross embedded to be a first sampling data of the left channel audio signal 311, the data sampling from the first sampling point "Mb1" of the second mixed signal 1116 is cross embedded to be a second sampling data of the left channel audio signal 311, and the data sampling from the first sampling point "Mc1" of the third mixed signal 1117 is cross embedded to be a third sampling data of the left channel audio signal 311. Meanwhile, the channel signals of the right channel group (not shown) are processed with the same steps to produce a right channel audio signal (not shown).

For producing low bass sound to the converted dual channel audio file 112, adding a low bass channel signal to the dual channel audio file 122 (S205). Sample an original low bass signal (not shown) of the multichannel audio file 111, which is the LFE channel signal in the embodiment as mentioned above, in a low bass sampling rate. The low bass sampling rate is N times larger than the sampling rate of the multichannel audio file 111. Then a low bass channel signal 1118 is therefore produced. Superimpose the low bass channel signal 1118 to the left channel audio signal 311 and the right channel audio signal respectively in a proportion of "a", for obtaining the dual channel audio file 112 with low bass effect. In this embodiment, the value of a is preferably 0.2.

It is assumed that the sampling rate of the multichannel audio file 111 is Fs. Sampling the dual channel audio file 112 in the same sampling rate as Fs, but outputting the dual channel audio file 112 in N times sampling rate (N×Fs) when broadcasting, which helps maintaining the quality of the sound.

Figure 4:
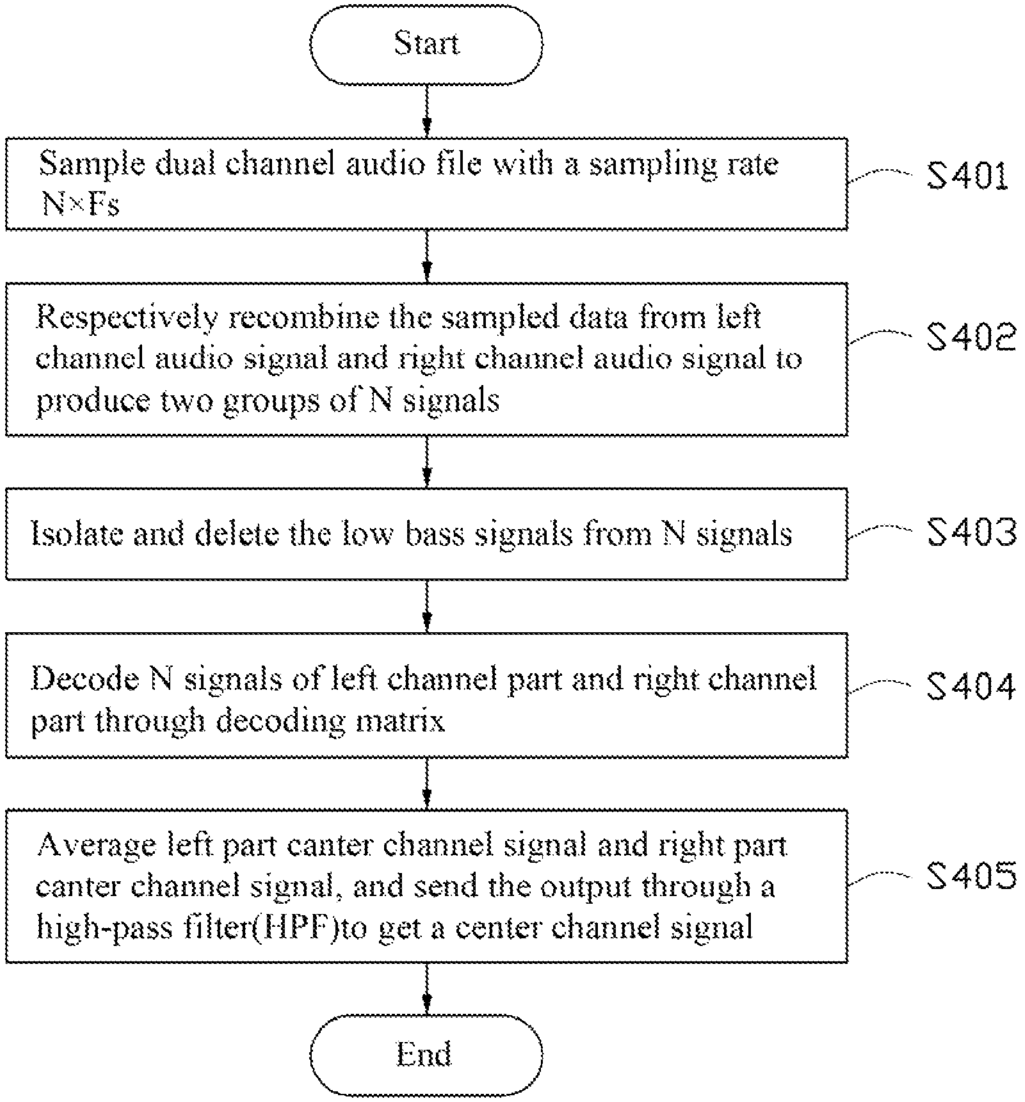
FIG. 4 is a flowchart showing how the electronic device converts the dual channel audio file to the multichannel audio file.
Figure 5:
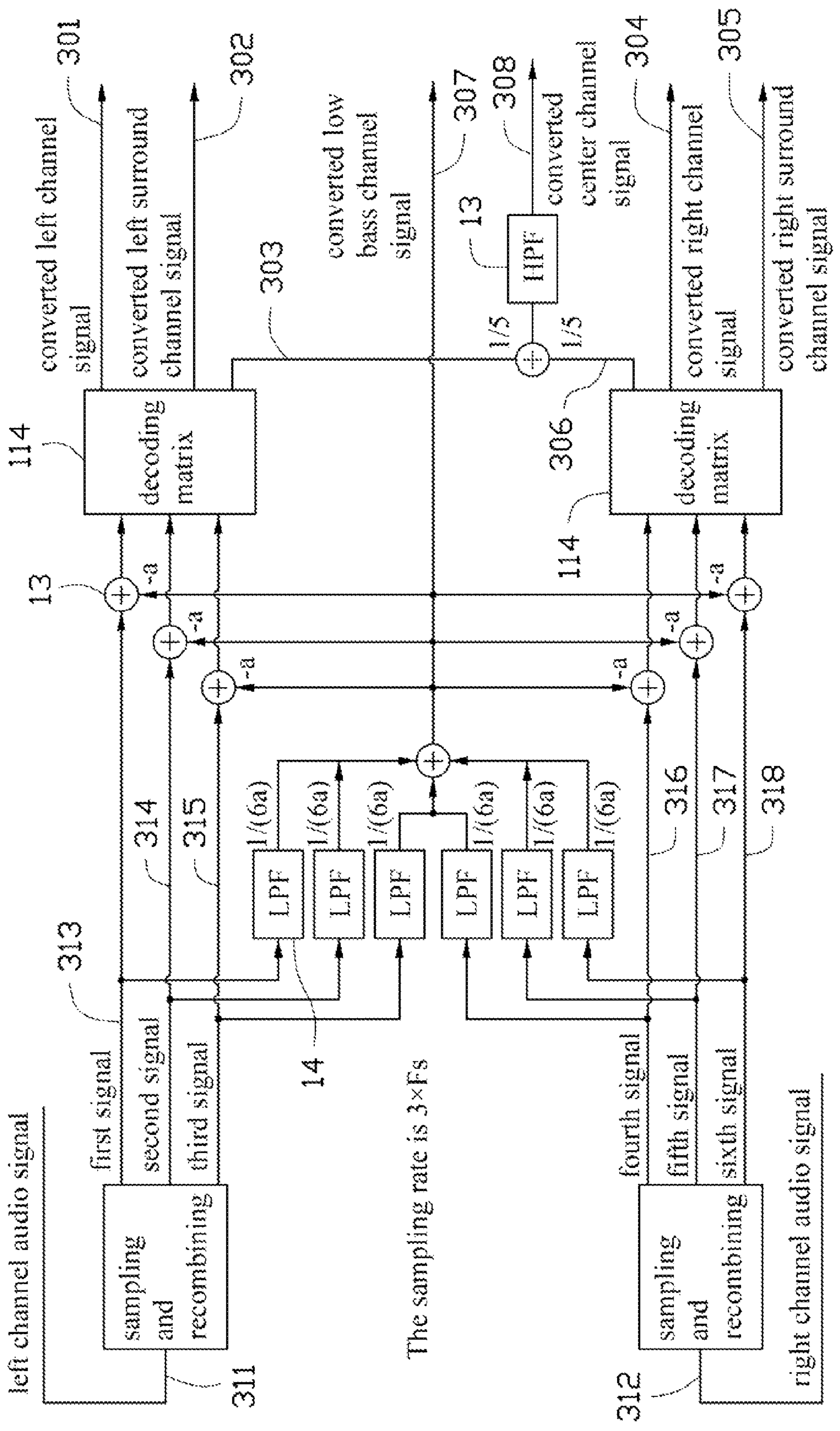
FIG. 5 is a block diagram showing how the electronic device converts the dual channel audio file to the multichannel audio file.

FIG. 4 and FIG. 5 illustrate how the dual-to-multi channel converting module 122 converts the dual channel audio file 112 back to the multichannel audio file 111 according to the exemplary embodiment. First, the dual-to-multi channel converting module 122 obtains the dual channel audio file 112 converted from the multi channel audio file 111 from the storage unit 11, and samples the left channel audio signal 311 and right channel audio signal 312 thereof in a sampling rate as N×Fs (S401). Then, the dual-to-multi channel converting module 122 respectively recombines the sampled left channel audio signal 311 and the sampled right channel audio signal 312 to produce N signals (S402).

Referring to FIG. 5, N is 3 in this embodiment, and it is assumed that the left channel audio signal 311 are sampled in M sampling times. The sampled data which the remainder of M/N is 1 is arranged as a first signal 313, the sampled data which the remainder of M/N is 2 is arranged as a second signal 314, and so on, the sampled data which the remainder of M/N is 0 is arranged as a N (third) signal 315. As the same, the right channel audio signal 312 is sampled and recombined to produce a fourth signal 316, a fifth signal 317 and a sixth signal 318. The first signal 313, the second signal 314, the third signal 315 are included in a left channel part, as the forth signal 316, the fifth signal 317 and the sixth signal 318 are included in a right channel part.

Next, the dual-multi converting module 112 isolates and deletes the low bass channel signals which has superimposed to the dual channel audio file 112 from the first signal 313, the second signal 314, the third signal 315, the forth signal 316, the fifth signal 317 and the sixth signal 318 (S403), since the multichannel audio file 111 has the original low bass channel signal in this embodiment. In detailed, making the recombined signals 313-318 pass the LPF (low-pass filter) 14 and averaging the outputs to isolate a low bass signal 307. And then, accordingly deleting it from the recombined signals 313-318 by passing the recombined signals 313-318 through the HPF (high-pass filter) 13.

Afterwards, the dual-multi converting module 112 respectively decoding the N signals 313-315 of the left channel part and the N signals 316-318 of the right channel part according to the decoding matrix 114 (S404). As shown in FIG. 5, decoded first signal 313 is relating to a converted left channel signal 301, decoded second signal 314 is relating to a converted left surround channel signal 302, and decoded third signal 315 is relating to a converted center channel signal 303 of the left channel part. As so, the decoded fourth signal 316 is relating to a converted right channel signal 301, the decoded fifth signal 317 is relating to a converted right surround channel signal 305, and the decoded sixth signal 318 is relating to a converted center channel signal 306 of the right channel part.

The dual-multi converting module 112 averages the converted center channel signal 303 of the left channel part and the converted center channel signal 306 of the right channel part, then sending the averaged output through the HPF (high-pass filter) 13 to get a converted center channel signal 308 (S405).

The decoding matrix 114 is the inverse of the mixed matrix 113. It is assumed that the mixed matrix 113 is:

$$\begin{Bmatrix} 1.00 & 0.70 & 0.40 \\ 1.05 & 0.60 & 0.45 \\ 0.95 & 0.60 & 0.50 \end{Bmatrix}$$

than the decoding matrix 114 should be:

$$\begin{Bmatrix} -2.1053 & 7.7193 & -5.2632 \\ 6.8421 & -8.4211 & 2.1053 \\ -4.2105 & -4.5614 & 9.4737 \end{Bmatrix}$$

The dual channel audio file 112 is therefore converted back to the multichannel audio file 111.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device for converting audio file format, having a storage unit storing a multichannel audio file containing a left channel group and a right channel group both of which have N channel signals and N is at least two, and a processor to perform a method comprising steps of:

mixing left channel signals of the left channel group through a mixed matrix which is a N×N matrix to form N left mixed signals;

cross embedding the N left mixed signals to form a left channel audio signal;

mixing right channel signals of the right channel group through the mixed matrix to form N right mixed signals; and cross embedding the N right mixed signals to form a right channel audio signal;

wherein the left channel audio signal and the right channel audio signal compose a dual channel audio file, the storage unit stores a decoding matrix which is the inverse of the mixed matrix, and the dual channel audio signal is converted to the multichannel audio file through the decoding matrix by sampling the dual channel audio signal in M sampling times, wherein a sampled data which the remainder of M/N is 1 is arranged as a first signal, a sampled data which the remainder of M/N is 2 is arranged as a second signal, and a sampled data which the remainder of M/N is 0 is arranged as a N signal.

2. The electronic device of claim 1, wherein the multichannel audio file comprises a center channel signal, which is included in the left channel group and included in the right channel group simultaneously.

3. The electronic device of claim 1, wherein the multichannel audio file comprises an original low pass channel signal, further comprising the steps of:

sampling the original low pass channel signal with a low pass sampling rate, while the low pass sampling rate is N times larger than the sampling rate of the multichannel audio file; and respectively superimposing the sampled low pass channel signals to the left channel audio signal and the right channel audio signal.

4. The electronic device of claim 1, wherein the method further comprising steps of:

sampling the dual channel audio file with a sampling rate N times larger than the sampling rate of the multichannel audio file;

respectively recombining the sampled data from the left channel audio signal and the right channel audio signal in order to form two group of N signals; and decoding the two group of N signals through the decoding matrix to produce the multichannel audio file.

* * * * *